US011595782B2

(12) United States Patent
Bageshwar et al.

(10) Patent No.: US 11,595,782 B2
(45) Date of Patent: Feb. 28, 2023

(54) INTEGRITY OF RANGE MEASUREMENTS

(71) Applicant: Honeywell International Inc., Charlotte, NC (US)

(72) Inventors: Vibhor L Bageshwar, Rosemount, MN (US); Michael Ray Elgersma, Plymouth, MN (US); Ross Merritt, Ramsey, MN (US)

(73) Assignee: Honeywell International Inc., Charlotte, NC (US)

( * ) Notice: Subject to any disclaimer, the term of this patent is extended or adjusted under 35 U.S.C. 154(b) by 70 days.

(21) Appl. No.: 17/237,841

(22) Filed: Apr. 22, 2021

(65) Prior Publication Data
US 2022/0038848 A1 Feb. 3, 2022

Related U.S. Application Data

(60) Provisional application No. 63/057,422, filed on Jul. 28, 2020.

(51) Int. Cl.
*H04W 4/02* (2018.01)
*G01S 5/02* (2010.01)

(52) U.S. Cl.
CPC .......... *H04W 4/023* (2013.01); *G01S 5/0284* (2013.01)

(58) Field of Classification Search
None
See application file for complete search history.

(56) References Cited

U.S. PATENT DOCUMENTS

| 8,326,329 B2 | 12/2012 | Nilsson |
| 10,018,729 B2 | 7/2018 | Dunik et al. |

(Continued)

FOREIGN PATENT DOCUMENTS

| CN | 107479069 A | 12/2017 |
| CN | 108088470 A | 5/2018 |
| GB | 2460406 B | 9/2012 |

OTHER PUBLICATIONS

Bageshwar, Vibhor L. et al., "Integrity Monitoring of Vehicle Kinematic States Using Map-Based, Vision Navigation Systems", U.S. Appl. No. 17/380,916, filed Jul. 20, 2021, pp. 1 through 46, Published: US.

(Continued)

*Primary Examiner* — Adolf Dsouza
(74) *Attorney, Agent, or Firm* — Fogg & Powers LLC

(57) ABSTRACT

A method of assuring integrity of range measurements and position solutions comprises obtaining range measurement statistics between network nodes, performing a snapshot integrity test for the range measurement statistics, and performing a sequential integrity test using the range measurement statistics. The snapshot integrity test comprises using Gram matrices with a current configuration of the nodes; performing a singular value consistency check using the Gram matrices against a user selected threshold; and detecting and excluding range measurement statistics with instantaneous errors that cause the singular value to exceed the threshold. The sequential integrity test comprises formulating main node and sub-node sets using solution separation; implementing filters for the main node and sub-node sets; performing a consistency check using discriminators and decision thresholds; detecting and excluding range measurement statistics with both instantaneous and time-correlated errors; and computing a protection level for relative positions computed from the main node and sub-node sets.

20 Claims, 8 Drawing Sheets

(56) References Cited

U.S. PATENT DOCUMENTS

| | | | |
|---|---|---|---|
| 10,659,919 B1* | 5/2020 | Li | H04L 61/5038 |
| 2006/0227664 A1* | 10/2006 | Horak | G01C 21/00 |
| | | | 367/136 |
| 2008/0232281 A1* | 9/2008 | Pahlavan | G01S 5/0289 |
| | | | 370/310 |
| 2016/0091341 A1 | 3/2016 | Fleureau et al. | |
| 2020/0249361 A1 | 8/2020 | McDonald et al. | |

OTHER PUBLICATIONS

Elgersma Michael R. et al., "Method and System for Planning Vehicle Trajectories by Enhancing En Route Navigation Performance", U.S. Appl. No. 17/350,959, filed Jun. 17, 2021, pp. 1 through 35, Published: US.

Elgersma, Michael R. et al., "Position Probability Density Function Filter to Determine Real-Time Measurement Errors for Map Based, Vision Navigation Systems", U.S. Appl. No. 17/340,921, filed Jun. 7, 2021; pp. 1-52.

Borg et al., "Modern Multidimensional Scaling, Theory and Applications", Second Edition, Springer, 2005, pp. 130, 431 and 432, Springer Science+Business Media, Inc.

Clot et al. "Sequential RAIM designed to detect combined step ramp pseudo-range errors", ION GNSS 19th International Technical Meeting of the Satellite Division, Sep. 2006, pp. 2621 through 2633, Fort Worth, TX.

Dattorro, "Convex Optimization & Euclidean Distance Geometry," 2005, pp. 10 through 11, 26 and 405 through 406, Meboo Publishing USA.

Nowak, "The Proposal to "Snapshot" RAIM Method for GNSS Vessel Receivers Working in Poor Space Segment Geometry", Polish Maritime Research 4(88), Dec. 2015, pp. 3 through 8.

\* cited by examiner

INTEGRITY OF RANGE MEASUREMENTS

CROSS REFERENCE TO RELATED APPLICATION

This application claims the benefit of and priority to U.S. Provisional Application No. 63/057,422, filed on Jul. 28, 2020, which is herein incorporated by reference.

BACKGROUND

Commercial and defense communication applications typically use one large, single antenna, at one single location, to accomplish operational tasks. This approach has several limitations. For example, large radio frequency (RF) emissions at a single location make the communication node easy to jam or spoof. Additionally, large RF emissions at a single location make the communication node easy to detect. Moreover, a single communication node has a single point of failure. Also, one large wattage RF communication node has large size, weight, and power (SWaP) requirements; and one large communication node is difficult to transport.

Therefore, a number of commercial and defense applications are moving to using multiple, smaller, low wattage, low SWaP, and mobile nodes to replicate performance of one large antenna node. This approach addresses the above limitations by having low RF emissions at multiple, mobile locations, which are difficult to jam and spoof. In addition, low RF emissions at multiple, mobile locations are difficult to detect, have no single point of failure, have low SWaP requirements, and are easy to transport.

Further, a number of applications are generally moving toward using multiple small vehicles, or swarms, instead of one large vehicle for ground, air, and space applications. All of these communication networks or vehicle swarms require precise relative positioning between communication nodes or vehicles for operational success. Examples of commercial communication networks include 5G and Wi-Fi systems.

SUMMARY

A method of assuring integrity of range measurements and position solutions estimated by a relative position-from-range measurement system is described herein. The method comprises obtaining one or more range measurement statistics between a plurality of nodes in a network; performing a snapshot integrity test for the one or more range measurement statistics, at a single epoch, for the nodes in the network; and performing a sequential integrity test using the one or more range measurement statistics, to assure the integrity of the relative positions of the nodes in the network. The snapshot integrity test comprises determining a current configuration of the nodes in the network; computing singular values using Gram matrices based on the current configuration of the nodes in the network; performing a singular value consistency check of the one or more range measurement statistics using the Gram matrices against a user selected threshold; and detecting and excluding any of the range measurement statistics with instantaneous errors that cause the singular values to exceed the user selected threshold. The sequential integrity test comprises formulating main node sets and sub-node sets using a solution separation technique for one or more combinations of in-view nodes; implementing a set of filters for each of the main node sets and sub-node sets; performing a consistency check of the one or more range measurement statistics using one or more discriminators and decision thresholds; detecting and excluding any of the range measurement statistics with both instantaneous and time-correlated errors; and computing a protection level for the relative positions computed from the main node and sub-node sets.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
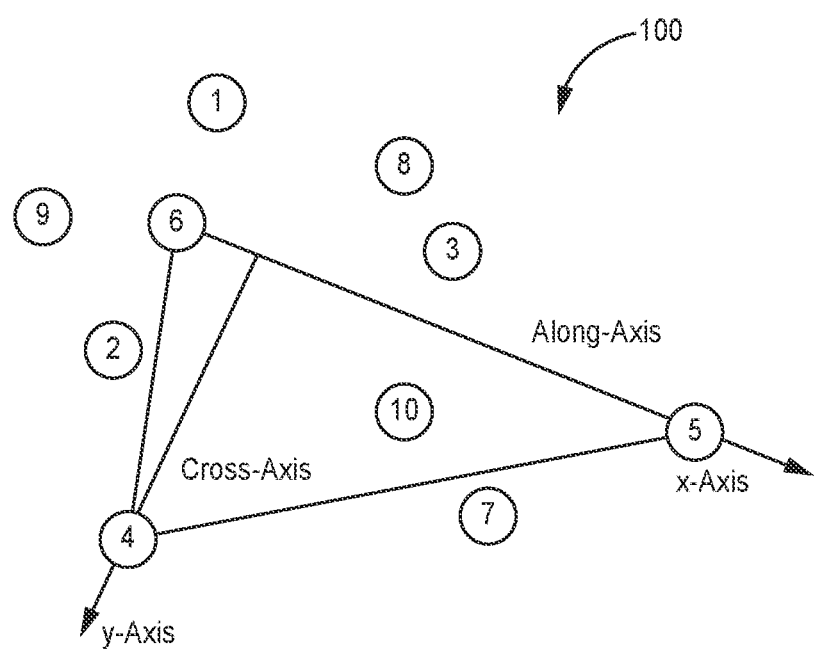
FIG. 1 is a schematic diagram of a node configuration with a local reference frame, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system of assuring integrity of range measurements is described herein. The method and system can be implemented to find errors in sets of range measurements between nodes in a network. For example, the present approach can be used to augment measurement statistics estimated from a relative position-from-range measurement system.

The present approach for assuring integrity of a positioning system can be done in two ways: 1) a snapshot integrity test using measurements at a single epoch with a receiver autonomous integrity monitoring (RAIM) approach for larger step or instantaneous errors; and 2) a sequential integrity test using a filter and measurements at multiple epochs with a solution separation approach for smaller step or instantaneous errors, ramp errors, and other types of time-correlated errors that cannot be detected at a single epoch.

A relative position-from-range measurement system for decentralized, network systems has been previously developed. This system is designed to precisely estimate the three-dimensional (3D) position of nodes, or vehicles, relative to one another using range measurement metadata. The system operates with the following general steps: a fully connected graph is constructed from the current nodes in the network; node triangles are selected to define local coordinate systems; a Gram matrix is formed to compute relative 3D position from range measurements; and filters are implemented at each node to smooth the estimated relative positions of other nodes. In the present approach, the snapshot integrity and sequential integrity tests can be provided for the relative position-from-range measurement system to assure the integrity of the estimated relative positions of nodes in a decentralized, network system.

The snapshot integrity test is performed using singular values of the Gram matrix to detect larger step errors in the range measurements. The snapshot integrity test is robust to noise in the range measurements and is less computationally expensive than typical RAIM tests.

In the sequential integrity test performed at each node, instead of using all range measurements, subsets of the range measurements are selected using node triangles to perform solution separation tests. Instead of forming one main solution and its subsets, this method forms sets of main solutions with specific subsets of sub-solutions for application to decentralized node networks. The sequential integrity test uses only sub-solutions to detect and identify faults in range measurements whereas typical implementations require sub-sub-solutions to detect and identify a single range measurement fault. Further, the concept of using node triangles to form main and sub-solutions minimizes the number of sub-solutions and minimizes the computational demands for the many nodes in a network.

When making computations based on measured ranges between pairs of nodes, it is important to know when one or more of the measured ranges is statistically inconsistent. If a node has one or more measured ranges with errors that are statistically inconsistent, then one or all of the node's range measurements can be eliminated from the computation, and computations based on the ranges between the remaining nodes can be made. The present approach is different than prior techniques, which do not give adequate ways to detect and exclude statistically inconsistent range measurements that cannot be determined using the standard filtering tests from a set of measured ranges between all pairs of nodes.

The present approach provides several advantages, including a system that assures the positioning integrity of a mobile, decentralized network; a system where each node can assess the integrity of the local network with which it is currently communicating as other nodes/vehicles move in and out of its line of sight; and robustness to spoofing of several nodes of the network. Another benefit of the present approach is that it is a two-step approach starting with a computationally inexpensive, snapshot first test using the Gram matrix, and a more computationally intensive second test using filters to find time-correlated errors that cannot be detected using the snapshot test. A further advantage of the present method is that a simple computational test can be used to prevent a system from using faulty range measurements, when computing relative positions between nodes from range measurements between node pairs.

As described previously, in various commercial and defense communication applications, the communications are typically performed using one high power transmit/receive communication node. This has the disadvantage of being subject to jamming and spoofing in one location, and the high power is easily detected. In addition, loss of a single node implies total loss of communication, and large SWaP requirements imply pedestrians cannot carry a node without difficulty. Further, a one node system is not easily adaptable for communication between a changing number of vehicles/pedestrians.

Thus, the replacement of one, high power node with multiple, low-power decentralized nodes in a communication network is desirable. In such an approach, the nodes cannot be easily jammed because the nodes do not have to be co-located in one location. A low-power system can be used so it is not as easily detected, and loss of one node does not disable the entire communication network. Further, pedestrians can easily carry lightweight nodes. Such nodes are easily adaptable for communication between a changing number of vehicles/pedestrians.

Decentralized communication networks require knowledge of the relative positions between the nodes in the network. Such communication networks provide range measurements to other nodes, such as by using a relative position-from-range measurement system. While relative position-from-range measurement systems exist, assuring the integrity of the relative node positions estimated by these systems needs to be provided to augment these systems for use by other systems or users. For example, errors in transmission/reception of the signal, signal in space, and hardware cause different types of errors on the range measurements. Standard checks include $chi^2$ tests of the predicted range and measured range before the application of the measurement update of a Bayesian filter. However, these standard checks do not exclude range measurements with errors that are smaller than the user defined thresholds that are part of the checks. The present approach can be used to augment these standard checks with two additional statistical checks to assure the integrity of the relative node position estimates computed from the communication network's range measurements.

These additional statistical checks include the snapshot integrity method that utilizes a Gram matrix consistency test, and the sequential integrity method that uses a solution separation test. These integrity methods are described in further detail hereafter.

Range Measurement Metadata: Assumptions

Measurement statistics include real-time range measurements and real-time standard deviations of the range measurements. Measurement time delays are available for all reachable nodes, which include the difference between time of availability and time of applicability. The measurements provide identification of the node pair for each range measurement, and the measurements include node identification (dismounted vs. vehicle operation).

Time-stamped range measurements can be asynchronous, with a maximum period between measurements that depends on either the maximum relative velocity between nodes or the maximum relative acceleration between nodes. The range measurements can be approximated as linear in time, and the range measurements can be converted to a common epoch for range-to-position computations. Each respective node provides identification of, and range to, the other nodes with which the respective node communicates.

Relative Position-from-Range Measurement System

In a relative position-from-range measurement system, a connected graph is developed between the nodes at each measurement epoch. Interconnections between graph nodes represent the current nodes that contribute to the range measurements. A local coordinate system is then established for a current node configuration.

For example, FIG. 1 shows a node configuration 100, in which a first node (e.g., node 6) is randomly selected, and a second node with a maximum range to the first node is selected (e.g., node 5). The line drawn from node 6 to node 5 is referred to as the along-axis and, for the local coordinate system, designated as the x-axis. A third node is selected (e.g., node 4) which maximizes the area of a triangle formed with the first two nodes. The line drawn orthogonal to the x-axis through this third node is referred to as the cross-axis and, for the local coordinate system, designated as the y-axis. In this case, nodes 6, 5, and 4 are used to define the local coordinate system and node triangle. A Gram matrix is used to formulate the coordinates of the local coordinate system. The general selection of three nodes enables the system algorithm to work in two dimensions. In order for the system algorithm to work in three dimensions, a fourth node is selected to define the z-axis. The fourth node is chosen to maximize the 3D volume of the tetrahedron whose base is the triangle formed with nodes 6, 5, and 4.

The 3D position coordinates are computed from the available range measurements at the measurement epoch using an Eigen-decomposition of the Gram matrix. This operation is robust to noise in the range measurements. A Bayesian filter, such as a Kalman filter, is then used to smooth the 3D position estimates computed from the range measurements at each measurement epoch. The Bayesian filter has sufficient flexibility to operate with pedestrians or vehicles by switching dynamic models. The Bayesian filter applies $chi^2$ statistical tests to ensure the range measurements are within a user selected number of standard deviations from the filter predicted range statistics.

Integrity Approach: Summary

The present approach provides integrity checks that can be used to augment the relative position-from-range measurement algorithm. In a first integrity method, a snapshot integrity test using the Gram matrix is used. In this method, the current configuration of the nodes is used, and the statistical consistency of range measurements at a measurement epoch is evaluated. This snapshot method then identifies and excludes range measurement errors, such as step errors.

In a second integrity method, a sequential integrity test using solution separation is employed. In this method, an exhaustive search of all node geometries is made, taking into account geometry history. This method evaluates statistical consistency of range measurements over a series of measurement epochs. The sequential integrity test identifies and excludes range measurements with step errors and time correlated errors, such as ramp errors, which cannot be detected using the snapshot integrity test. The sequential integrity test can use a Bayesian filter, such as a Kalman filter, to check for slowly varying range measurement errors.

Each node runs both the snapshot integrity test and the sequential integrity test independently of the other nodes. Each node has the ability to identify a faulty node in the network in case of a node communication failure. This information can then be shared between nodes.

Figure 2A:
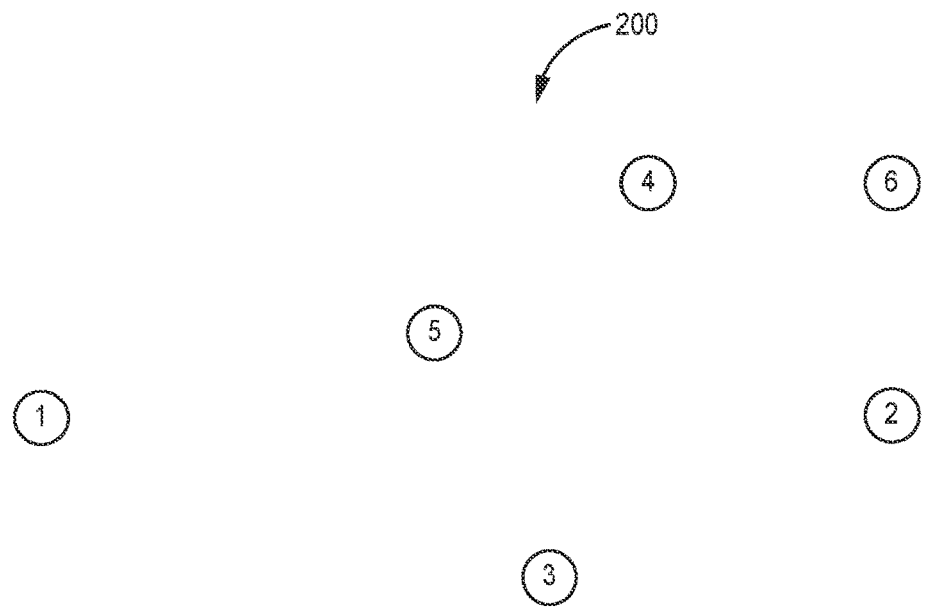
FIGS. 2A and 2B are schematic diagrams of an example node configuration at a single epoch, in which the nodes can be stationary or moving.
Figure 2B:
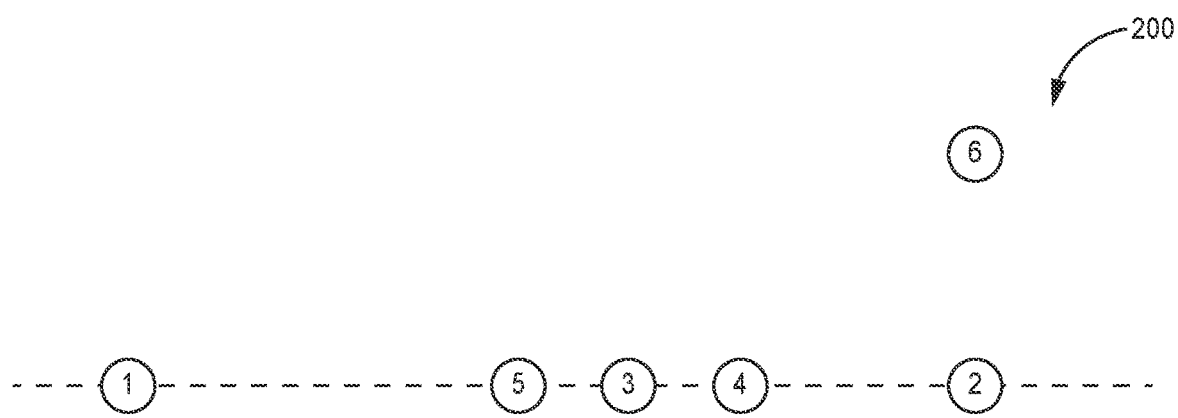

FIGS. 2A and 2B show an example node configuration 200 at a single epoch for six nodes (1 to 6). The nodes can be stationary nodes or mobile nodes.

In particular, FIG. 2A is a top view of node configuration 200, showing the six nodes (1 to 6). FIG. 2B is a side view of node configuration 200, where five nodes (1, 5, 3, 4, 2) are ordered in the same horizontal axis (left-to-right) in the same plane, and node 6 is shown out of plane.

The objective is to compute relative 3D node positions from range measurements. For example, the nodes can be located on a plurality of vehicles, and the range measurements between the nodes can be obtained by one or more range sensors located on the vehicles. Alternatively, the nodes can be located on a plurality of pedestrians, who carry appropriate range sensors to obtain the range measurements.

The present approach can be implemented with multiple vehicles (or swarm) that operate on the ground, on the water surface, underwater, in the air, or in outer space. For example, a swarm of unmanned aerial vehicles can be operated using the present approach.

Integrity Approach: Snapshot Integrity Test

The snapshot integrity test is based on a Gram matrix, by eliminating one node at a time and checking the singular values of the associated matrices.

In a Gram matrix: for n nodes located in three-dimensional space, let X be a 3-by-n matrix with column i containing the vector position of node i. Let V be an (n–1)-by-n matrix whose first column has all negative ones, and whose last n–1 columns form the identity matrix. Let Xs=X*transpose(V), so Xs has n–1 columns, where column i is the vector position of node i minus the vector position of node 1. The (n–1)-by-(n–1) Gram matrix G is defined as G=transpose(Xs)*Xs. Since Xs is 3-by-(n–1), rank(Xs)=3, so rank(G)=3 for no error range measurements so the fourth singular value of G should be zero. When the range measurements are corrupted with noise, the fourth singular value of G will be approximately equal to the square of the largest standard deviation of the range measurement errors. If the fourth singular value of G exceeds some threshold, then a range measurement from some node is corrupted with an error that is too large.

By removing one node at a time and constructing the Gram matrix using the remaining nodes, the method determines which node has faulty range measurements. For example, let Gi be the Gram matrix constructed without using node i. If the fourth singular value of G is too large, but the fourth singular value of Gi is small, then some range measurement from node i is bad. To detect two nodes that have range errors, the Gram matrix Gij could be used which has nodes i and j removed. In practice, the measurements are the ranges between nodes and not the vector positions of node i so the X matrix is not available. However, the Gram matrix can be built from just the measured ranges by defining the n-by-n D matrix: D(i,j)=(range between node i and node j)^2. Using the V matrix defined above, the Gram matrix can be defined as G=V*(–D/2)*transpose(V).

Figure 3:
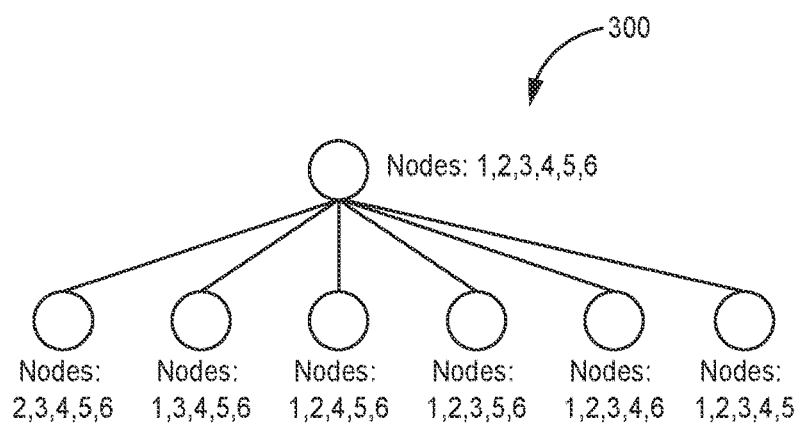
FIG. 3 is a schematic diagram of an example node configuration for use in a snapshot integrity test.

In the snapshot integrity test, it is assumed there are N nodes, and N combinations are formed using n=N–1 node groups. FIG. 3 shows an example node configuration 300 for this approach, which includes six nodes (1 to 6), with six combinations of N–1 node groups: nodes 2,3,4,5,6; nodes 1,3,4,5,6; nodes 1,2,4,5,6; nodes 1,2,3,5,6; nodes 1,2,3,4,6; and nodes 1,2,3,4,5.

The Gram matrices and their singular values constructed from all N nodes and N–1 sub-node combinations provide a consistency check of the range measurements from all the nodes. This method computes singular values of Gram matrix using all nodes, G, and the Gram matrix using N–1 sub-node combinations, $G_i$, where i is the missing node. The Gram matrices, G and $G_i$, are 4×4 matrices and are at least of rank 3. With no range measurement noise, the $4^{th}$ largest singular value of G is 0: $\sigma_4(G)=\sigma_{4,0}=0$. With range measurement noise, the $4^{th}$ largest singular value of G is non-zero: $\sigma_4(G)=\sigma_{4,0} \neq 0$. The $4^{th}$ largest singular value of $G_i$ is defined as $\sigma_4(G_i)=\sigma_{4,i}$. The range measurement consistency checks are based on selecting a user specified threshold, $\varepsilon$ and comparing $\sigma_{4,0}$ and $\sigma_{4,i}$ to $\varepsilon$.

For the consistency check: $\sigma_{4,0}$ is computed from the Gram matrix formed using nodes 1,2,3,4,5,6; $\sigma_{4,6}$ is computed from the Gram matrix formed using nodes 1,2,3,4,5; $\sigma_{4,5}$ is computed from the Gram matrix formed using nodes 1,2,3,4,6; $\sigma_{4,4}$ is computed from the Gram matrix formed using nodes 1,2,3,5,6; $\sigma_{4,3}$ is computed from the Gram matrix formed using nodes 1,2,4,5,6; $\sigma_{4,2}$ is computed from the Gram matrix formed using nodes 1,3,4,5,6; and $\sigma_{4,1}$ is computed from the Gram matrix formed using nodes 2,3,4,5,6.

This method performs a singular value consistency check comparing the Gram matrices formed using all N nodes and the Gram matrices formed using all N−1 sub-node combinations against a user selected threshold $\varepsilon$. Table 1 hereafter summarizes the results of the consistency check for the snapshot integrity test. A constraint of the Gram matrix is $\sigma_{4,0} > \sigma_{4,i}$. An additional check is required to identify faulty nodes if $\sigma_{4,0} > \varepsilon$ and $\sigma_{4,i} > \varepsilon$.

TABLE 1

| N Nodes | N-1 Sub-Nodes | Consistency Check |
|---|---|---|
| $\sigma_{4,0} < \varepsilon$ | $\sigma_{4,i} < \varepsilon$ | Gram test passed: all range measurements satisfy Gram consistency check. |
| $\sigma_{4,0} < \varepsilon$ | $\sigma_{4,i} > \varepsilon$ | Gram test passed: all range measurements satisfy Gram consistency check; (second column condition not possible; violates constraint). |
| $\sigma_{4,0} > \varepsilon$ | $\sigma_{4,i} < \varepsilon$ | Gram test indicates that the range measurement to Node i is faulty. |
| $\sigma_{4,0} > \varepsilon$ | $\sigma_{4,i} > \varepsilon$ | Gram test failed: at least one faulty node; ID of faulty nodes uncertain. |

Integrity Approach: Sequential Integrity Test

In the sequential integrity test, each node is considered individually as an anchor node. The sequential integrity test is implemented using a solution separation approach. The solution separation approach requires formulation of a unique main node set and unique sub-node set for combinations of in-view nodes using all node triangles. The nodes can move in and out of view of one another (non-line of sight (LOS)) or can leave the network. The main node sets include unique combinations of node triangles. The sub-node sets are combinations of N−1 in view nodes that maintain the same main node triangle. A constraint ensures that the sub-node set maintains the same local coordinate reference frame.

A Bayesian filter is implemented for each main node set and sub-node set. The filter is only implemented if the node combination has LOS and is in network. This provides simplified stochastic systems to minimize computational demands. A consistency check is implemented using discriminators and decision thresholds.

Further details of the sequential integrity test are described as follows.

Node Combinations

Figure 4A:
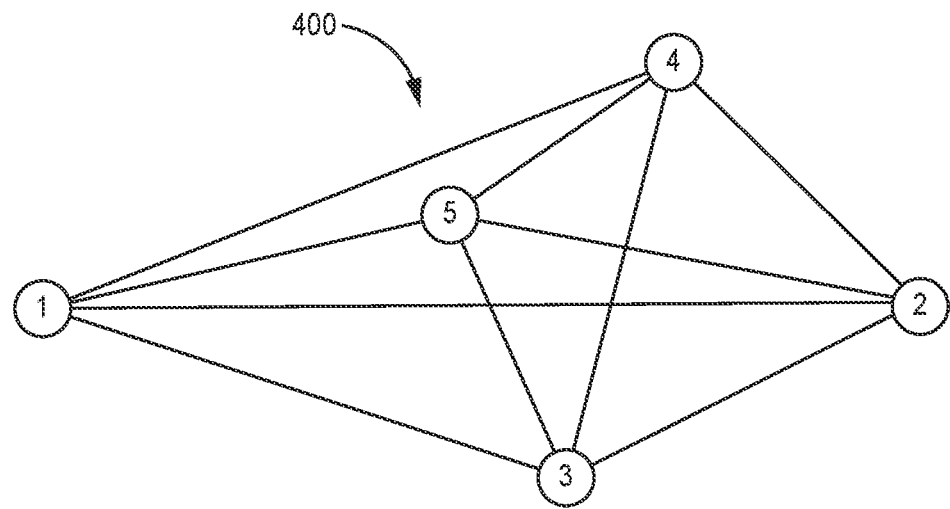
FIG. 4A is schematic diagram of a node configuration showing a fully-connected graph for all communicating nodes.
Figure 4B:
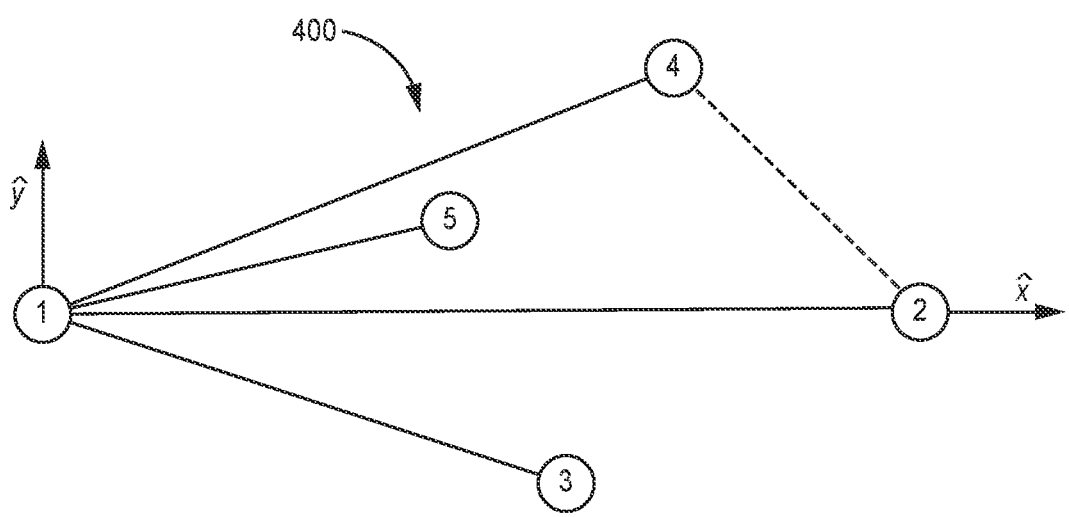
FIG. 4B is schematic diagram of a node combination example of the node configuration of FIG. 4A, according to one embodiment.

A fully-connected graph for all communicating nodes is developed at a measurement epoch (N nodes in total), such as shown in FIG. 4A for node configuration 400, which includes five nodes (1 to 5) (N=5). A local coordinate frame is selected for each node triangle. In one node combination example, shown in FIG. 4B, node 1 is selected as the anchor node and as the origin of a local coordinate frame. FIG. 4B shows an example node triangle: 1, 2, 4. There are four available range measurements from node 1, including: a range measurement of node 2 relative to node 1; a range measurement of node 3 relative to node 1; a range measurement of node 4 relative to node 1; and a range measurement of node 5 relative to node 1.

Table 2 shows the possible node combinations according to one example. Since node 2 is always part of these node triangles, only nodes 3, 4, 5 are part of the sequential integrity test.

TABLE 2

| Node Combination | Anchor Node | Node Triangle | Remaining Nodes |
|---|---|---|---|
| Main | 1 | 2.3 | 4.5 |
| Sub | 1 | 2.3 | 4 |
| Sub | 1 | 2.3 | 5 |
| Main | 1 | 2.4 | 3.5 |
| Sub | 1 | 2.4 | 3 |
| Sub | 1 | 2.4 | 5 |
| Main | 1 | 2.5 | 3.4 |
| Sub | 1 | 2.5 | 3 |
| Sub | 1 | 2.5 | 4 |

Table 3 shows the possible node combinations according to another example. The selection of sub-nodes enables detection and identification of two faulty measurements.

TABLE 3

| Node Combination | Anchor Node | Node Triangle | Remaining Nodes |
|---|---|---|---|
| Main | 1 | 3.4 | 2.5 |
| Sub | 1 | 3.4 | 2 |
| Sub | 1 | 3.4 | 5 |
| Main | 1 | 3.5 | 2.4 |
| Sub | 1 | 3.5 | 2 |
| Sub | 1 | 3.5 | 4 |
| Main | 1 | 4.5 | 2.3 |
| Sub | 1 | 4.5 | 2 |
| Sub | 1 | 4.5 | 3 |

Tables 2 and 3 show all possible node combinations using node 1 as the anchor node.

Figures 5A, 5B, 5C:
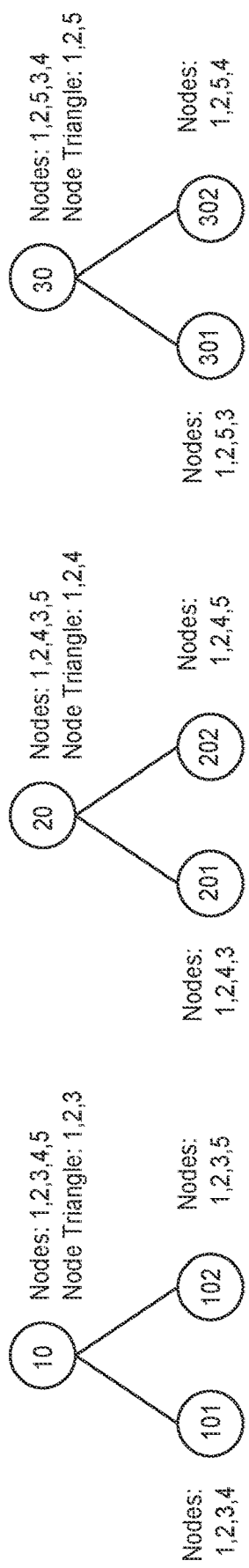
FIGS. 5A-5F illustrate various node combinations according to further examples, in which node selection is done using node triangles.
Figures 5D, 5E, 5F:
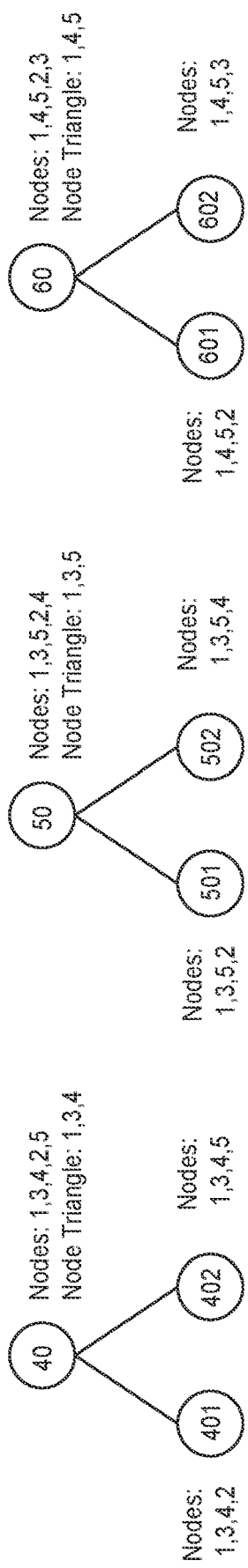

FIGS. 5A-5F illustrate possible node combinations according to the examples in Tables 2 and 3, in which node selection is done using node triangles. The anchor node is node 1; and N=5 (number of nodes). In the sequential integrity test, at each anchor node, a filter is implemented for each main node set and sub-node set. For example, with anchor node 1, six main filters are implemented for the main node set and 12 sub-filters are implemented for the sub-node set. This is shown as six main filters 10, 20, 30, 40, 50, 60, respectively in FIGS. 5A to 5F. Each main filter has N−3=2 sub-filters (with approximately the same local coordinate frame). Thus, main filter 10 has two sub-filters 101, 102 (FIG. 5A); main filter 20 has two sub-filters 201, 202 (FIG. 5B); main filter 30 has two sub-filters 301, 302 (FIG. 5C); main filter 40 has two sub-filters 401, 402 (FIG. 5D); main filter 50 has two sub-filters 501, 502 (FIG. 5E); and main filter 60 has two sub-filters 601, 602 (FIG. 5F).

A measurement update only occurs if the relative range measurement metadata is provided at the current measurement epoch. The filters provide relative 3D position statistics of all nodes relative to the anchor node.

Standard Kalman Filter Equations

As mentioned previously, the sequential integrity test can use a Kalman filter to check for time correlated range measurement errors. The Kalman filter equations include:

a time update:

$$X_{k+1/k} = \Phi_k X_{k/k}$$

$$P_{k+1/k} = \Phi_k P_{k/k} \Phi_k^T + Q_k$$

where:
- X≡state (mean) vector,
- P≡state covariance matrix,
- Φ≡dynamic (or state transition) matrix,
- Q≡process noise covariance matrix, and
- $(*)_k$ ≡index of a time epoch;

a measurement update:

$$K_{k+1} = P_{k+1/k} H_{k+1}^T (R_{k+1} + H_{k+1} P_{k+1/k} H_{k+1}^T)^{-1}$$

$$X_{k+1/k+1} = X_{k+1/k} + K_{k+1}(Z_{k+1} - H_{k+1} X_{k+1/k})$$

$$P_{k+1/k+1} = (I - K_{k+1} H_{k+1}) P_{k+1/k} (I - K_{k+1} H_{k+1})^T - K_{k+1} R_{k+1} K_{k+1}^T$$

where:
- K≡Kalman gain matrix,
- H≡measurement matrix,
- R≡measurement noise covariance matrix,
- Z≡measurement vector, and
- $(*)_k$≡index of a time epoch.

In an example of state vectors, the anchor node 1 includes: the main filter 10; and sub-filters 101, 102:

$$X_{10} = [x_{21}^T x_{31}^T x_{41}^T x_{51}^T]^T$$

$$X_{101} = [x_{21}^T x_{31}^T x_{41}^T]^T$$

$$X_{102} = [x_{21}^T x_{31}^T x_{51}^T]^T$$

the main filter 20; and sub-filters 201, 202:

$$X_{20} [x_{21}^T x_{41}^T x_{31}^T x_{51}^T]^T$$

$$X_{201} = [x_{21}^T x_{41}^T x_{31}^T]^T$$

$$X_{202} = [x_{21}^T x_{41}^T x_{51}^T]^T$$

the main filter 30; and sub-filters 301, 302:

$$X_{30} [x_{21}^T x_{51}^T x_{31}^T x_{41}^T]^T$$

$$X_{301} = [x_{21}^T x_{51}^T x_{31}^T]^T$$

$$X_{302} = [x_{21}^T x_{51}^T x_{41}^T]^T$$

the main filter 40; and sub-filters 401, 402:

$$X_{40} [x_{31}^T x_{41}^T x_{21}^T x_{51}^T]^T$$

$$X_{401} = [x_{31}^T x_{41}^T x_{21}^T]^T$$

$$X_{402} = [x_{31}^T x_{41}^T x_{51}^T]^T$$

the main filter 50; and sub-filters 501, 502:

$$X_{50} [x_{31}^T x_{51}^T x_{21}^T x_{41}^T]^T$$

$$X_{501} = [x_{31}^T x_{51}^T x_{21}^T]^T$$

$$X_{502} = [x_{31}^T x_{51}^T x_{41}^T]^T$$

the main filter 60; and sub-filters 601, 602:

$$X_{60} [x_{41}^T x_{51}^T x_{21}^T x_{31}^T]^T$$

$$X_{601} = [x_{41}^T x_{51}^T x_{21}^T]^T$$

$$X_{602} = [x_{41}^T x_{51}^T x_{31}^T]^T$$

A measurement consistency check is performed, such as a Chi$^2$ test in each Kalman filter comparing the predicted 3D position to the measured 3D position. In an example using anchor node 1 and main filter 10:

$$(z_{2/1,k+1} - H_{k+1} x_{2/1,k+1/k})^T (R_{2/1,k+1} + H_{k+1} P_{k+1/k} H_{k+1}^T)^{-1}$$
$$(z_{2/1,k+1} - H_{k+1} x_{2/1,k+1}) \leq \varepsilon_2$$

where:
- $\varepsilon_2$≡ user selected threshold (number of standard deviations).

The solution separation approach using the main solution and sub-solutions enables the computation of three statistics: 1) discriminator; 2) decision threshold; and 3) protection level. The position protection level is a statistical bound of the position error computed to guarantee that the probability of the absolute position error exceeding the corresponding protection level is less than or equal to the target integrity risk. The protection level is an estimate for the actual error of the estimated mean since the true trajectory is unknown.

The definitions of integrity probabilities are listed as follows:
- $p_{hmi}$ =probability of hazardously misleading information,
- $p_{fm}$=probability of false measurement,
- $p_{cf}$=probability of communication node failure,
- $p_{md}$ =probability of missed node detection,
- $K_A(P_A)$=alert coefficient that depends on probability $P_A$ where: $K_A(P_A) = Q^{-1}(P_A)$, and
- $Q(x) = \int_x^\infty e^{-u^2/2} du$ (tail of distribution).

The probabilities $p_{fm}$ and $p_{md}$ are determined by allocating the total integrity risk, $P_{hmi}$, and the continuity risk among the sub-filters.

Discriminator

The discriminator includes a 2 norm of the corresponding states of the main filter and sub-filters. The distance between the main filter position vector and sub-filter position vector is represented as:

$$dx_{i0j} = x_{i0} - x_{i0j} \text{ where } i \in \{\text{main filter set}\} \text{ and } j \in \{\text{sub-filter set}\}$$

$$d_{i0j} = \|dx_{i0j}\|_2.$$

Decision Threshold

The decision threshold is computed from the separation covariance matrix, $dP_{i0j}$, and the probability of false measurement as follows:

$$dP_{i0j} = E\{(x_{i0} - x_{i0j} - E\{x_{i0} - x_{i0j}\})(x_{i0} - x_{i0j} - E\{x_{i0} - x_{i0j}\})^T\}$$

$$dP_{i0j} = P_{i0} + P_{i0j} - 2P_{i0/i0j}^{cross}$$

$$D_{i0j} = K_{fm} \sqrt{\lambda^{dP_{i0j}}}$$

$$K_{fm} = Q^{-1}\left(\frac{P_{fm}}{2M}\right),$$

where M≡total number of sub-filters for an anchor node,
- $D_{i0j}$≡decision threshold,
- $\lambda^{dP_{i0j}}$≡maximum eigenvalue of the separation covariance matrix, and
- $K_{fm}$≡false measurement coefficient.

For the integrity check, there is a faulty measurement if the discriminator exceeds the decision threshold:

$$d_{i0j} > D_{i0j}$$

For one faulty measurement, the faulty measurement will corrupt all the main filters and sub-filters to which it contributes. All the main filters and sub-filters that do not contain contributions from that node will have discriminators that exceed the decision threshold. Multiple main and sub-filters will corroborate a failure of a single node so sub-sub filters are not necessary. For two faulty measurements originating from an anchor node, sub-sub node combinations are necessary to detect and identify measurement faults at the anchor node. However, the main filters and sub-filters from other anchor nodes can be used to detect and identify the faulty measurements originating from the first anchor mode. This approach requires the measurement faults to be communicated from one anchor node to another anchor mode.

Table 4 summarizes the application of the discriminator and decision threshold for main filters 10 and 20. In this example: the anchor node is node 1; the failure is in node 5; and the third and seventh rows of Table 4 indicate the test results corresponding to the failure in node 5.

TABLE 4

| Main Filter | Integrity Check | Result |
|---|---|---|
| 10 | $d_{101} < D_{101}$ & $d_{102} < D_{102}$ | Measurements 4/1 and 5/1 are consistent. |
|  | $d_{101} < D_{101}$ & $d_{102} < D_{102}$ | Measurement 4/1 is consistent and 5/1 is inconsistent. |
|  | $d_{101} < D_{101}$ & $d_{102} < D_{102}$ | Measurement 4/1 is inconsistent and 5/1 is consistent. |
|  | $d_{101} < D_{101}$ & $d_{102} < D_{102}$ | Measurements 4/1 and 5/1 are inconsistent; require tests from other main nodes and their sub-filters. |
| 20 | $d_{201} < D_{201}$ & $d_{202} < D_{202}$ | Measurements 3/1 and 5/1 are consistent. |
|  | $d_{201} < D_{201}$ & $d_{202} < D_{202}$ | Measurement 3/1 is consistent and 5/1 is inconsistent. |
|  | $d_{201} < D_{201}$ & $d_{202} < D_{202}$ | Measurement 3/1 is inconsistent and 5/1 is consistent. |
|  | $d_{201} < D_{201}$ & $d_{202} < D_{202}$ | Measurements 3/1 and 5/1 are inconsistent; require tests from other main nodes and their sub-filters. |

Table 5 summarizes the application of the discriminator and decision threshold for main filters 30 and 40. In this example: the anchor node is node 1; the failure is in node 5; and the first and sixth rows indicate the test results corresponding to the failure in node 5.

TABLE 5

| Main Filter | Integrity Check | Result |
|---|---|---|
| 30 | $d_{301} < D_{301}$ & $d_{302} < D_{302}$ | Measurements 3/1 and 4/1 are consistent. |
|  | $d_{301} < D_{301}$ & $d_{302} < D_{302}$ | Measurement 3/1 is consistent and 4/1 is inconsistent. |
|  | $d_{301} < D_{301}$ & $d_{302} < D_{302}$ | Measurement 3/1 is inconsistent and 4/1 is consistent. |
|  | $d_{301} < D_{301}$ & $d_{302} < D_{302}$ | Measurements 3/1 and 4/1 are inconsistent; require tests from other main nodes and their sub-filters. |
| 40 | $d_{401} < D_{401}$ & $d_{402} < D_{402}$ | Measurements 2/1 and 5/1 are consistent. |
|  | $d_{401} < D_{401}$ & $d_{402} < D_{402}$ | Measurement 2/1 is consistent and 5/1 is inconsistent. |
|  | $d_{401} < D_{401}$ & $d_{402} < D_{402}$ | Measurement 2/1 is inconsistent and 5/1 is consistent. |
|  | $d_{401} < D_{401}$ & $d_{402} < D_{402}$ | Measurements 2/1 and 5/1 are inconsistent; require tests from other main nodes and their sub-filters. |

Table 6 summarizes the application of the discriminator and decision threshold for main filters 50 and 60. In this example: the anchor node is node 1; the failure is in node 5; and the first and fifth rows indicate the test results corresponding to the failure in node 5.

TABLE 6

| Main Filter | Integrity Check | Result |
|---|---|---|
| 50 | $d_{501} < D_{501}$ & $d_{502} < D_{502}$ | Measurements 2/1 and 4/1 are consistent. |
|  | $d_{501} < D_{501}$ & $d_{502} < D_{502}$ | Measurement 2/1 is consistent and 4/1 is inconsistent. |
|  | $d_{501} > D_{501}$ & $d_{502} < D_{502}$ | Measurement 2/1 is inconsistent and 4/1 is consistent. |
|  | $d_{501} > D_{501}$ & $d_{502} < D_{502}$ | Measurements 2/1 and 4/1 are inconsistent; require tests from other main nodes and their sub-filters. |
| 60 | $d_{601} > D_{601}$ & $d_{602} < D_{602}$ | Measurements 2/1 and 3/1 are consistent. |
|  | $d_{601} > D_{601}$ & $d_{602} < D_{602}$ | Measurement 2/1 is consistent and 3/1 is inconsistent. |
|  | $d_{601} > D_{601}$ & $d_{602} < D_{602}$ | Measurement 2/1 is inconsistent and 3/1 is consistent. |
|  | $d_{601} > D_{601}$ & $d_{602} < D_{602}$ | Measurements 2/1 and 3/1 are inconsistent; require tests from other main nodes and their sub-filters. |

Protection Level

The protection level is defined as the maximum error of relative position as follows:

$$PL_{i0j} = D_{i0j} + a_{i0j}$$

$$a_{i0j} = K_{md}\sqrt{\lambda^{P_{i0j}}}$$

$$K_{md} = Q^{-1}(p_{md})$$

where:

$P_{i0j}$ = state covariance matrix of the i0j sub-filter,
$\lambda^{P_{i0j}}$ = maximum eigenvalue of $P_{i0j}$, and
$K_{md}$ = missed detection coefficient.

The protection level can be compared to user defined alert levels to assure the performance of the relative position-from-range measurement system.

Other Node Combination Examples

Figure 6A:
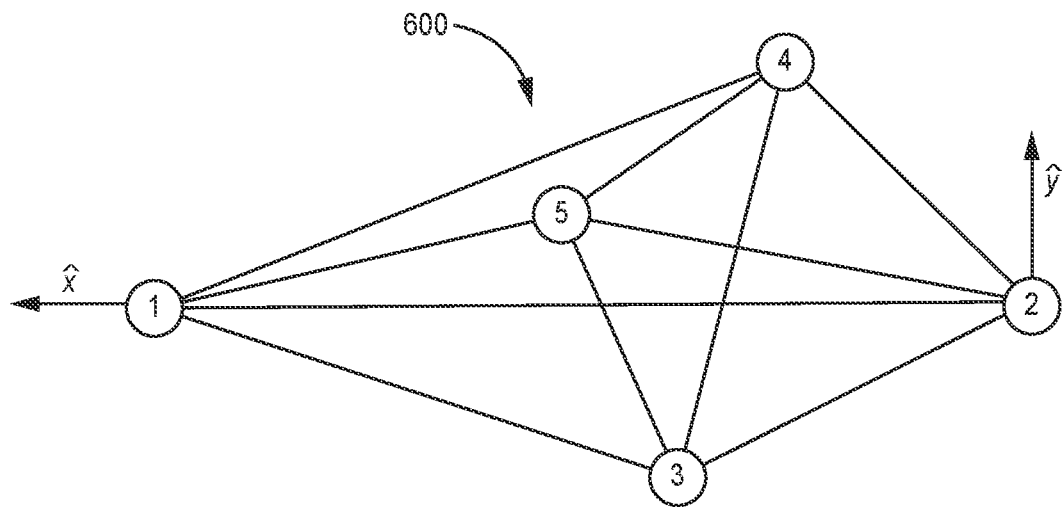
FIGS. 6A-6D are schematic diagrams of node combination examples, according to various embodiments.

Another node combination example is shown in FIG. 6A for a node configuration 600, which includes five nodes (1 to 5) (N=5). In this example, the anchor node is node 2, and is selected as the origin of the local coordinate frame. A local coordinate frame is also selected for each node triangle. FIG. 6A depicts an example node triangle: 2, 1, 4.

Figure 6B:
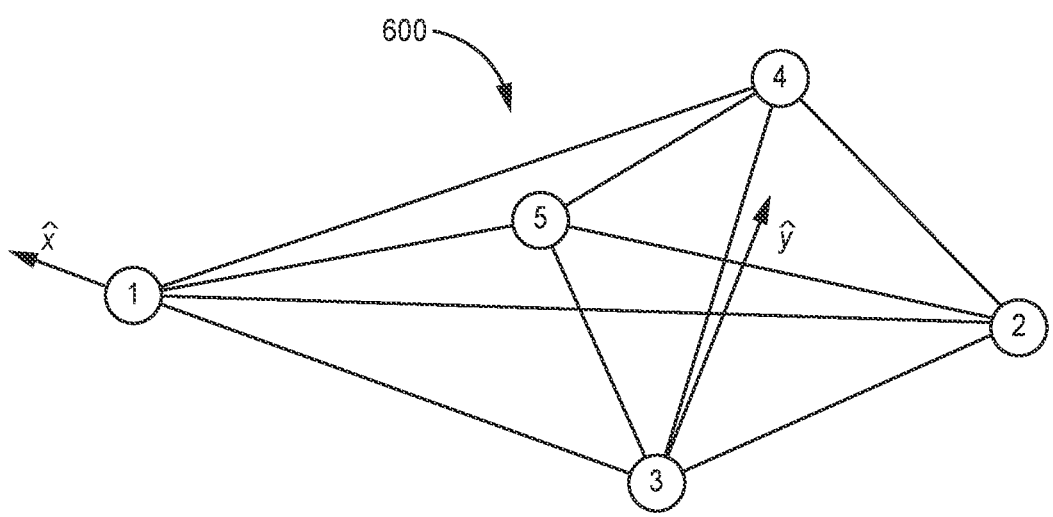

FIG. 6B shows a further node combination example for node configuration 600. In this example, the anchor node is node 3, and is selected as the origin of the local coordinate frame. A local coordinate frame is also selected for each node triangle. FIG. 6B depicts an example node triangle: 3, 1, 4.

Figure 6C:
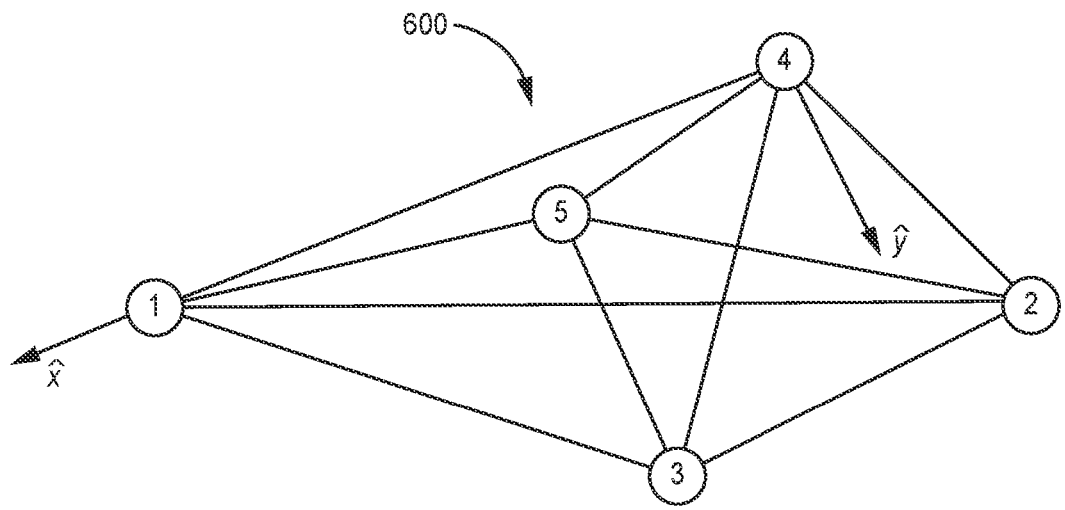

In another node combination example, shown in FIG. 6C for node configuration 600, the anchor node is node 4, and is selected as the origin of the local coordinate frame. A local coordinate frame is also selected for each node triangle. FIG. 6C depicts an example node triangle: 4, 1, 3.

Figure 6D:
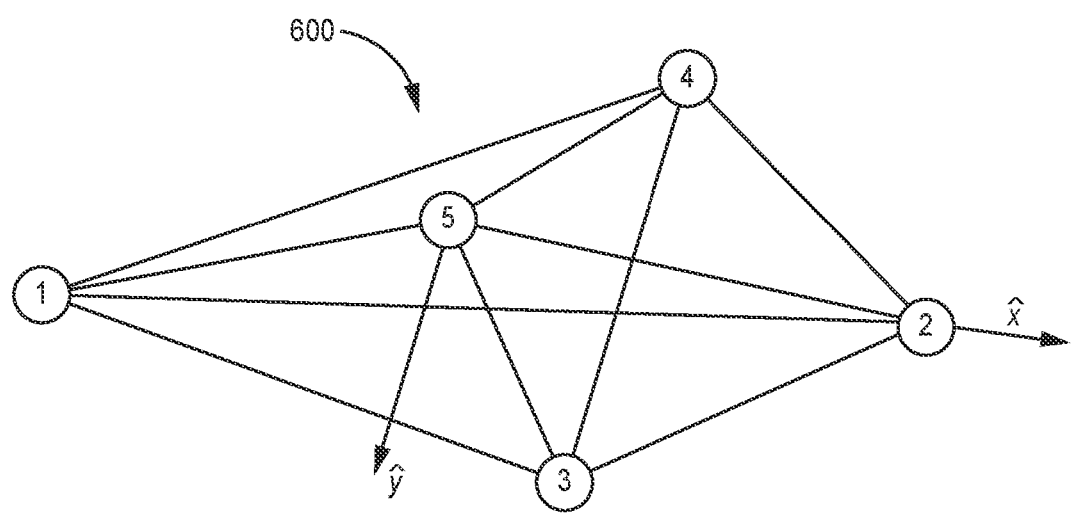

In a further node combination example, shown in FIG. 6D for node configuration 600, the anchor node is node 5, and is selected as the origin of the local coordinate frame. A local coordinate frame is also selected for each node triangle. FIG. 6D depicts an example node triangle: 5, 2, 3.

Figure 7A:
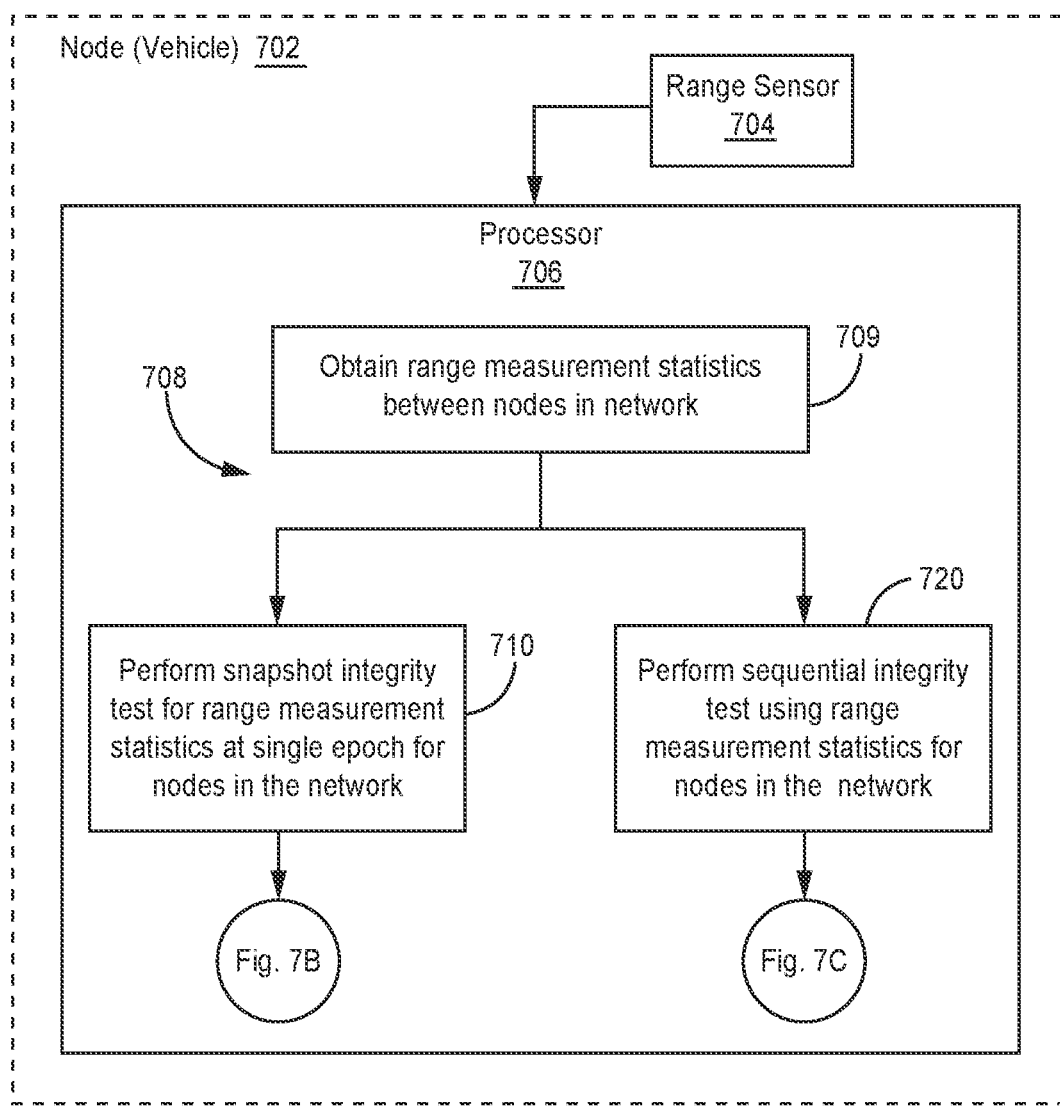
FIG. 7A is a block diagram of a system for assuring integrity of range measurements and position solutions for nodes in a network, according to an exemplary implementation.

FIG. 7A is a block diagram of a system for assuring integrity of range measurements and position solutions for nodes in a network, according to an exemplary implementation. FIG. 7A shows a respective node 702, such as a vehicle, which is operative to communicate with other nodes in the network through a decentralized communication network, such as a 5G network, a Wi-Fi network, or the like. The node 702 includes at least one range sensor 704 operative to obtain range measurements between node 702 and other nodes in the network. The node 702 includes a processor 706 operatively coupled to range sensor 704. The processor is operative to perform a method 708 of assuring integrity of range measurements and position solutions for the nodes in the network. The method 708 obtains one or more range measurement statistics between the nodes in the network at 709. The method 708 then performs a snapshot integrity test 710 for the one or more range measurement statistics, at a single epoch, for the nodes in the network. Further details of the snapshot integrity test 710 are shown in the flow diagram of FIG. 7B, which is described below. The method 708 also performs a sequential integrity test 720 using the one or more range measurement statistics to assure the integrity of relative positions of the nodes in the network. Further details of the sequential integrity test 720 are shown in the flow diagram of FIG. 7C, which is described hereafter.

Figure 7C:
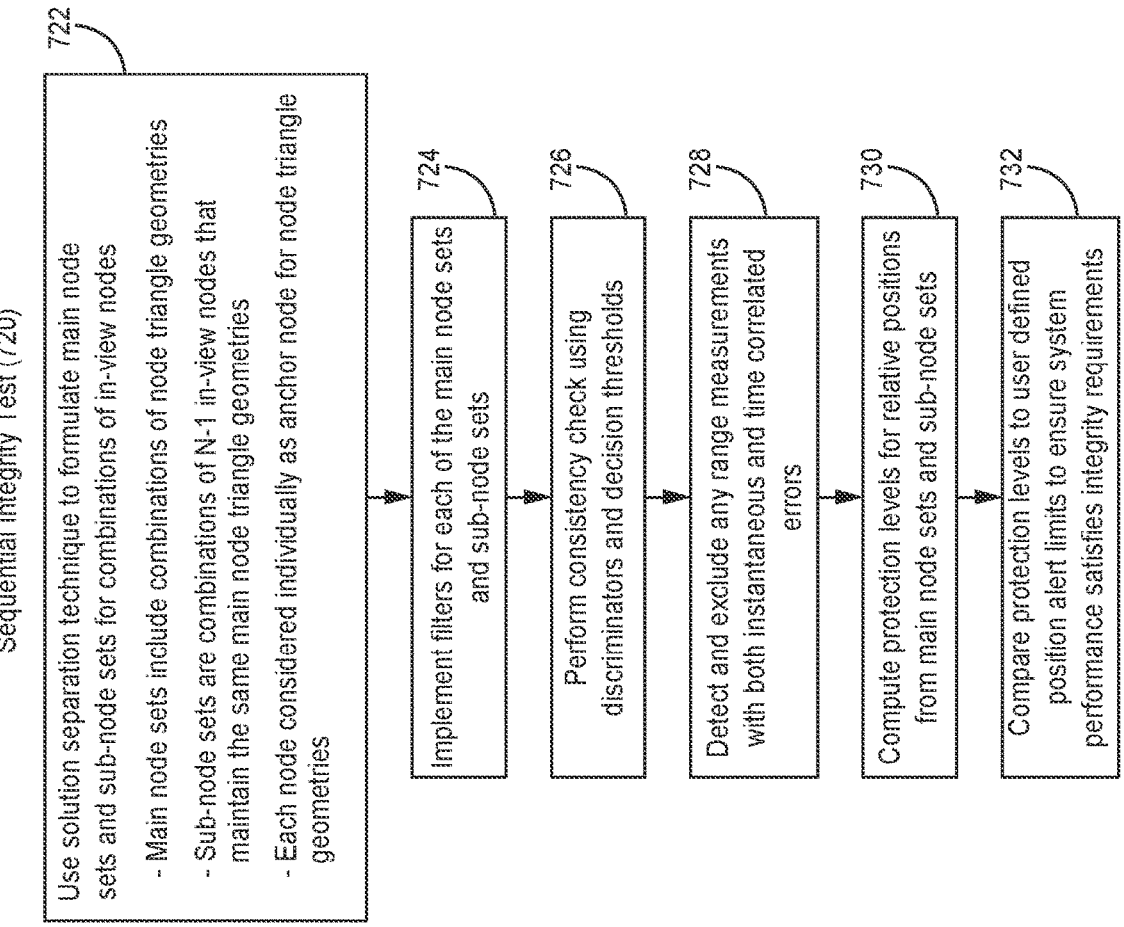
FIG. 7C is a flow diagram for a sequential integrity test, which is implemented in the system of FIG. 7A.
Figure 7B:
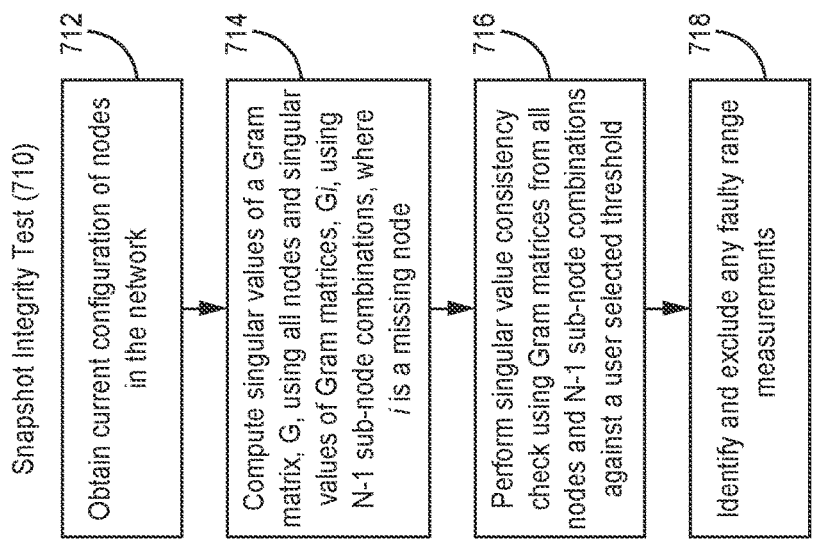
FIG. 7B is a flow diagram for a snapshot integrity test, which is implemented in the system of FIG. 7A.

As depicted in FIG. 7B, the snapshot integrity test 710 obtains a current configuration of the nodes in the network (block 712), and computes singular values of a Gram matrix, G, using all nodes and singular values of Gram matrices, $G_i$, using N–1 sub-node combinations, where i is a missing node (block 714). A singular value consistency check is then performed using the Gram matrices from all nodes and N–1 sub-node combinations against a user selected threshold (block 716). The snapshot integrity test 710 then identifies and excludes any faulty range measurements with, for example, step errors (block 718).

As shown in FIG. 7C, the sequential integrity test 720 uses a solution separation technique to formulate main node sets and sub-node sets for one or more combinations of in-view nodes (block 722). The main node sets include one or more combinations of node triangle geometries, and the sub-node sets are one or more combinations of N–1 in-view nodes that maintain the same main node triangle geometries. In addition, each node in the network is considered individually as an anchor node for the node triangle geometries. The sequential integrity test 720 implements a set of filters for each of the main node sets and sub-node sets (block 724), and performs a consistency check of the range measurement statistics using discriminators and decision thresholds (block 726). The sequential integrity test 720 then detects and excludes any range measurements statistics with instantaneous and time-correlated errors, for example, ramp errors (block 728). Thereafter, protection levels are computed for the relative positions from the main node sets and sub-node sets (block 730), and the protection levels are compared to user defined position alert limits to ensure system performance satisfies integrity requirements (block 732).

The processing units and/or other computational devices used in the method and system described herein may be implemented using software, firmware, hardware, or appropriate combinations thereof. The processing unit and/or other computational devices may be supplemented by, or incorporated in, specially-designed application-specific integrated circuits (ASICs) or field programmable gate arrays (FPGAs). In some implementations, the processing unit and/or other computational devices may communicate through an additional transceiver with other computing devices outside of the navigation system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method of assuring integrity of range measurements and position solutions estimated by a relative position-from-range measurement system, the method comprising: obtaining one or more range measurement statistics between a plurality of nodes in a network; performing a snapshot integrity test for the one or more range measurement statistics, at a single epoch, for the nodes in the network, wherein the snapshot integrity test comprises: determining a current configuration of the nodes in the network; computing singular values using Gram matrices based on the current configuration of the nodes in the network; performing a singular value consistency check of the one or more range measurement statistics using the Gram matrices against a user selected threshold; and detecting and excluding any of the range measurement statistics with instantaneous errors that cause the singular values to exceed the user selected threshold; performing a sequential integrity test using the one or more range measurement statistics, to assure the integrity of relative positions of the nodes in the network, wherein the sequential integrity test comprises: formulating main node sets and sub-node sets using a solution separation technique for one or more combinations of in-view nodes; implementing a set of filters for each of the main node sets and sub-node sets; performing a consistency check of the one or more range measurement statistics using one or more discriminators and decision thresholds; detecting and excluding any of the range measurement statistics with both instantaneous and time-correlated errors; and computing a protection level for relative positions computed from the main node and sub-node sets.

Example 2 includes the method of Example 1, wherein each node performs both the snapshot integrity test and the sequential integrity test independently of the other nodes; and each node is operative to identify a faulty node in the network as a result of a node communication failure, and notify the other nodes of the identity of the faulty node in the network.

Example 3 includes the method of any of Examples 1-2, wherein computing singular values using the Gram matrices comprises: computing singular values of a Gram matrix, G, using all nodes N; and computing singular values of Gram matrices, $G_i$, using N-1 sub-node combinations, where i is a missing node.

Example 4 includes the method of Example 3, wherein performing the singular value consistency check of the one or more range measurement statistics comprises using the Gram matrices, from all the nodes N and the N-1 sub-node combinations, against the user selected threshold.

Example 5 includes the method of any of Examples 1-4, wherein the main node sets include one or more combinations of node triangle geometries; and the sub-node sets are one or more combinations of N-1 in-view nodes that maintain the same main node triangle geometries.

Example 6 includes the method of Example 5, wherein each node in the network is considered individually as an anchor node for the node triangle geometries.

Example 7 includes the method of any of Examples 1-6, wherein the set of filters for each of the main node sets and sub-node sets comprise Bayesian filters.

Example 8 includes the method of any of Examples 1-7, further comprising comparing the protection level to user defined position alert limits to ensure system performance satisfies integrity requirements.

Example 9 includes the method of any of Examples 1-8, wherein the one or more range measurement statistics include real-time range measurements and real-time standard deviations of the range measurements.

Example 10 includes the method of any of Examples 1-9, wherein the network includes a decentralized communication network comprising a 5G network or a Wi-Fi network.

Example 11 includes the method of any of Examples 1-10, wherein one or more of the nodes are stationary nodes or mobile nodes.

Example 12 includes the method of any of Examples 1-11, wherein the nodes are located on a plurality of vehicles.

Example 13 includes the method of Example 12, wherein the vehicles are configured to operate on ground, on water surfaces, underwater, in air, or in outer space.

Example 14 includes the method of Example 12, wherein the vehicles comprise a swarm of unmanned aerial vehicles.

Example 15 includes a system comprising: a plurality of nodes in a network; wherein each respective node in the network includes at least one range sensor operative to obtain range measurements between the respective node and other nodes in the network; wherein each respective node includes a processor operatively coupled to the at least one range sensor, the processor operative to perform a method of assuring integrity of range measurements and position solutions for the nodes, the method comprising: performing a snapshot integrity test for one or more range measurement statistics, at a single epoch, for the nodes in the network, wherein the snapshot integrity test comprises: obtaining a current configuration of the nodes in the network; computing singular values of a Gram matrix, G, using all nodes N and singular values of Gram matrices, $G_i$, using N-1 sub-node combinations, where i is a missing node; performing a singular value consistency check of the one or more range measurement statistics using the Gram matrices from all nodes and N-1 sub-node combinations against a user selected threshold; and identifying and excluding any of the range measurement statistics with instantaneous errors that cause the singular values to exceed the user selected threshold; and performing a sequential integrity test using the one or more range measurement statistics, to assure the integrity of relative positions of the nodes in the network, wherein the sequential integrity test comprises: formulating main node sets and sub-node sets using a solution separation technique for one or more combinations of in-view nodes, wherein the main node sets include one or more combinations of node triangle geometries, and the sub-node sets are one or more combinations of N-1 in-view nodes that maintain the same main node triangle geometries; implementing a set of filters for each of the main node sets and sub-node sets; performing a consistency check of the one or more range measurement statistics using one or more discriminators and decision thresholds; detecting and excluding any of the range measurement statistics with both instantaneous and time-correlated errors; and computing a protection level for relative positions computed from the main node and sub-node sets; wherein each node in the network is considered individually as an anchor node for the node triangle geometries.

Example 16 includes the system of Example 15, wherein the one or more range measurement statistics are obtained from a relative position-from-range measurement system.

Example 17 includes the system of Example 16, wherein the one or more range measurement statistics include real-time range measurements and real-time standard deviations of the range measurements.

Example 18 includes the system of any of Examples 15-17, wherein the set of filters for each of the main node sets and sub-node sets comprise Kalman filters.

Example 19 includes the system of any of Examples 15-18, wherein the sequential integrity test further comprises: comparing the protection levels to user defined position alert limits to ensure system performance satisfies integrity requirements.

Example 20 includes the system of any of Examples 15-19, wherein the nodes are located on a plurality of vehicles.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method of assuring integrity of range measurements and position solutions estimated by a relative position-from-range measurement system, the method comprising:
   obtaining one or more range measurement statistics between a plurality of nodes in a network;
   performing a snapshot integrity test for the one or more range measurement statistics, at a single epoch, for the nodes in the network, wherein the snapshot integrity test comprises:
   determining a current configuration of the nodes in the network;

computing singular values using Gram matrices based on the current configuration of the nodes in the network;

performing a singular value consistency check of the one or more range measurement statistics using the Gram matrices against a user selected threshold;

and detecting and excluding any of the range measurement statistics with instantaneous errors that cause the singular values to exceed the user selected threshold;

performing a sequential integrity test using the one or more range measurement statistics, to assure the integrity of relative positions of the nodes in the network, wherein the sequential integrity test comprises:

formulating main node sets and sub-node sets using a solution separation technique for one or more combinations of in-view nodes;

implementing a set of filters for each of the main node sets and sub-node sets;

performing a consistency check of the one or more range measurement statistics using one or more discriminators and decision thresholds;

detecting and excluding any of the range measurement statistics with both instantaneous and time-correlated errors; and computing a protection level for relative positions computed from the main node and sub-node sets.

2. The method of claim 1, wherein:
each node performs both the snapshot integrity test and the sequential integrity test independently of the other nodes; and
each node is operative to identify a faulty node in the network as a result of a node communication failure, and notify the other nodes of the identity of the faulty node in the network.

3. The method of claim 1, wherein computing singular values using the Gram matrices comprises:
computing singular values of a Gram matrix, G, using all nodes N; and
computing singular values of Gram matrices, $G_i$, using N−1 sub-node combinations, where i is a missing node.

4. The method of claim 3, wherein performing the singular value consistency check of the one or more range measurement statistics comprises:
using the Gram matrices, from all the nodes N and the N−1 sub-node combinations, against the user selected threshold.

5. The method of claim 1, wherein:
the main node sets include one or more combinations of node triangle geometries; and
the sub-node sets are one or more combinations of N−1 in-view nodes that maintain the same main node triangle geometries.

6. The method of claim 5, wherein each node in the network is considered individually as an anchor node for the node triangle geometries.

7. The method of claim 1, wherein the set of filters for each of the main node sets and sub-node sets comprise Bayesian filters.

8. The method of claim 1, further comprising comparing the protection level to user defined position alert limits to ensure system performance satisfies integrity requirements.

9. The method of claim 1, wherein the one or more range measurement statistics include real-time range measurements and real-time standard deviations of the range measurements.

10. The method of claim 1, wherein the network includes a decentralized communication network comprising a 5G network or a Wi-Fi network.

11. The method of claim 1, wherein one or more of the nodes are stationary nodes or mobile nodes.

12. The method of claim 1, wherein the nodes are located on a plurality of vehicles.

13. The method of claim 12, wherein the vehicles are configured to operate on ground, on water surfaces, underwater, in air, or in outer space.

14. The method of claim 12, wherein the vehicles comprise a swarm of unmanned aerial vehicles.

15. A system comprising:
a plurality of nodes in a network;
wherein each respective node in the network includes at least one range sensor operative to obtain range measurements between the respective node and other nodes in the network;
wherein each respective node includes a processor operatively coupled to the at least one range sensor, the processor operative to perform a method of assuring integrity of range measurements and position solutions for the nodes, the method comprising:
performing a snapshot integrity test for one or more range measurement statistics, at a single epoch, for the nodes in the network, wherein the snapshot integrity test comprises:
obtaining a current configuration of the nodes in the network;
computing singular values of a Gram matrix, G, using all nodes N and singular values of Gram matrices, $G_i$, using N−1 sub-node combinations, where i is a missing node;
performing a singular value consistency check of the one or more range measurement statistics using the Gram matrices from all nodes and N−1 sub-node combinations against a user selected threshold; and
identifying and excluding any of the range measurement statistics with instantaneous errors that cause the singular values to exceed the user selected threshold; and
performing a sequential integrity test using the one or more range measurement statistics, to assure the integrity of relative positions of the nodes in the network, wherein the sequential integrity test comprises:
formulating main node sets and sub-node sets using a solution separation technique for one or more combinations of in-view nodes, wherein the main node sets include one or more combinations of node triangle geometries, and the sub-node sets are one or more combinations of N−1 in-view nodes that maintain the same main node triangle geometries;
implementing a set of filters for each of the main node sets and sub-node sets;
performing a consistency check of the one or more range measurement statistics using one or more discriminators and decision thresholds;
detecting and excluding any of the range measurement statistics with both instantaneous and time-correlated errors; and
computing a protection level for relative positions computed from the main node and sub-node sets;

wherein each node in the network is considered individually as an anchor node for the node triangle geometries.

16. The system of claim 15, wherein the one or more range measurement statistics are obtained from a relative position-from-range measurement system.

17. The system of claim 16, wherein the one or more range measurement statistics include real-time range measurements and real-time standard deviations of the range measurements.

18. The system of claim 15, wherein the set of filters for each of the main node sets and sub-node sets comprise Kalman filters.

19. The system of claim 15, wherein the sequential integrity test further comprises:
    comparing the protection levels to user defined position alert limits to ensure system performance satisfies integrity requirements.

20. The system of claim 15, wherein the nodes are located on a plurality of vehicles.

* * * * *